United States Patent
Rinke et al.

(10) Patent No.: US 8,511,283 B2
(45) Date of Patent: Aug. 20, 2013

(54) ICE FENCE FOR DIESEL FUEL SUCTION TUBE

(75) Inventors: Gordon G Rinke, Sterling Heights, MI (US); Terry R. Wilton, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 349 days.

(21) Appl. No.: 13/006,839

(22) Filed: Jan. 14, 2011

(65) Prior Publication Data

US 2012/0181293 A1    Jul. 19, 2012

(51) Int. Cl.
*F02M 37/04*    (2006.01)
*F02M 37/08*    (2006.01)

(52) U.S. Cl.
USPC ......................................................... 123/509

(58) Field of Classification Search
USPC .......... 123/509, 514; 417/201, 313; 220/694
See application file for complete search history.

(56) References Cited

U.S. PATENT DOCUMENTS

| | | | | |
|---|---|---|---|---|
| 5,360,322 A * | 11/1994 | Henein et al. | ................. | 417/313 |
| 5,699,773 A * | 12/1997 | Kleppner et al. | ............. | 123/510 |
| 5,881,699 A * | 3/1999 | Brown et al. | ................. | 123/514 |
| 6,805,538 B2 * | 10/2004 | Djordjevic | .................... | 417/201 |
| 7,350,509 B2 * | 4/2008 | Barz et al. | ..................... | 123/509 |
| 2008/0196780 A1 * | 8/2008 | Tipton et al. | .................. | 137/861 |

* cited by examiner

*Primary Examiner* — Mahmoud Gimie

(57) ABSTRACT

A diesel fuel system includes a reservoir containing diesel fuel. A suction tube extends into the reservoir and has an inlet so that fuel can be suctioned into the suction tube. A fence is erected around the inlet to prevent ice wafers from entering the inlet and blocking the suction tube. The fence can be mounted on the floor of the reservoir. Or, the fence can be mounted on the suction tube.

17 Claims, 1 Drawing Sheet

ICE FENCE FOR DIESEL FUEL SUCTION TUBE

FIELD OF THE INVENTION

The present invention relates to a suction tube for the fuel pump of a diesel engine and more particularly provides an ice fence to prevent ice wafers residing in the fuel reservoir from blocking the fuel suction tube.

BACKGROUND OF THE INVENTION

Diesel engines are susceptible to starting problems in conditions of extreme cold temperature. The prior art has recognized that under extreme cold temperatures the diesel fuel can begin to gel and thereby become difficult to pump. Proposed solutions have included the use of fuel tank heaters, or storing the vehicle in a heated building.

We have discovered that in extreme cold temperatures, the small amount of water that can be contained in the diesel fuel will settle to the bottom of the fuel tank or reservoir and freeze to form ice wafers or pebbles. When the engine is started, the ice wafers can be sucked toward the fuel suction tube that is suspended in the reservoir. The presence of the ice wafer can actually block the flow of fuel and lead to an eventual stalling of the engine. In the vehicle service industry, this failure is commonly diagnosed as a clogging of the fuel filter. Thus, the service technician will routinely change the fuel filter. But, while the fuel filter is being changed, the vehicle will heat up in the service garage and the ice wafer will melt, unblocking the fuel suction tube. Of course, the engine will start and the service technician will believe he has fixed the problem by changing the fuel filter, whereas more likely, the problem solved itself by the melting of the ice wafer that had blocked the suction tube.

It would be desirable to provide a solution to the problem of ice wafers being sucked into the fuel suction tube of a diesel engine fuel reservoir.

SUMMARY OF THE INVENTION

A diesel fuel system includes a reservoir containing diesel fuel. A suction tube extends into the reservoir and has an inlet so that fuel can be suctioned into the suction tube. A fence is erected around the inlet to prevent ice wafers from entering the inlet and blocking the suction tube. The fence can be mounted on the floor of the reservoir. Or, the fence can be mounted on the suction tube.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and not intended to limit the invention, its application, or uses.

Figure 1:
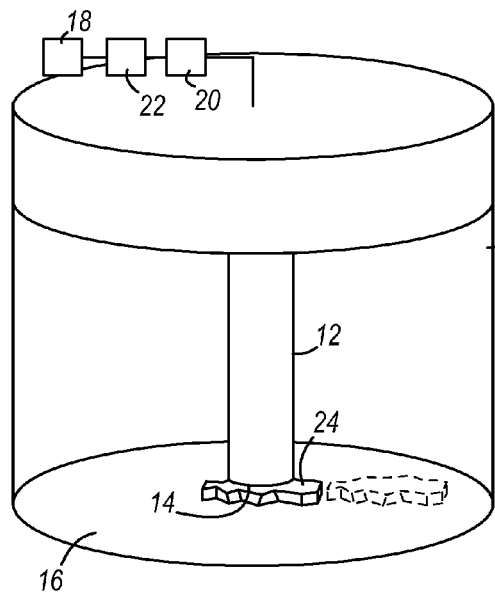
FIG. 1 is a side elevation view of a diesel fuel reservoir having a fuel suction tube suspended just above the floor of the reservoir, and showing an ice wafer blocking the suction tube.

Referring to FIG. 1, a fuel tank or reservoir 10 contains diesel fuel. A hollow fuel suction tube 12 has an inlet 14 that is suspended just above floor 16 of the reservoir 10. The suction tube 12 connects to a fuel pump 18. A water separator 20 and a fuel filter 22 are between the suction tube 12 and the fuel pump 18.

FIG. 1 shows an ice wafer 24 that has formed on the floor 16 of the reservoir 10 due to the vehicle being exposed extreme low temperature, such as −25 C. At extreme cold temperatures, even a slight amount of water within the diesel fuel will settle onto the floor 16 of the reservoir 10 and freeze, thereby forming the ice wafer 24. FIG. 1 shows that upon startup of the vehicle, the wafer 24 has slid across the floor 16 and been sucked upwardly and has entirely or partially blocked the inlet 14 of the suction tube 12. Eventually then, the fuel pump 18 will be starved for fuel and the diesel engine will stall.

Figure 2:
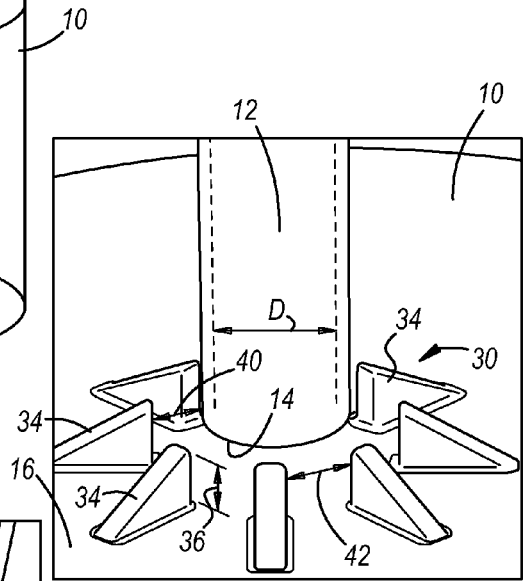
FIG. 2 is a view similar to FIG. 1 but showing a fence mounted on the floor of the reservoir to prevent ice wafers from reaching the inlet of the fuel suction tube.

Referring to FIG. 2, an ice fence, generally indicated at 30, is provided on the reservoir floor 16 and surrounds the inlet 14 of the suction tube 12 to prevent ice wafers from being sucked into the inlet 14. In particular, the ice fence 30 includes a plurality of triangle-shaped posts 34 molded integrally with the floor 16 of the reservoir and rise therefrom. The posts 34 are arrayed in a circle around the suction tube 12 to prevent ice wafers from being sucked into the inlet 14. In particular, the height of each of the posts 34, as designated at 36, is preferably greater than the spacing between the floor 16 of reservoir 10 and the bottom of the inlet 14 of the suction tube 12. In addition, the distance from each post to the wall of the suction tube 12, as designated 40 in FIG. 2, is preferably less than the diameter "D" of the inlet 14 of the suction tube 12. And the distance between the posts, designated at 42, is also less than the diameter "D" of the inlet 14. Providing a post height 36 greater than the spacing between the reservoir floor 16 and the bottom of inlet 14, placing the posts 34 sufficiently close to the suction tube 12 at distance 40, and placing the posts close together at distance 42, prevents the ice wafers 24 from entering into the space directly beneath the suction tube 12 until the wafers melt to a small enough size to pass through the suction tube 12. Instead, the ice wafers are held at a distance from the inlet 14 by the presence of the fence posts 34. The distance 42 between the posts 34 creates a fuel flow opening of sufficient size that any dirt that may be in the fuel cannot become trapped between the posts 34 and clog the flow of fuel into the inlet 14. Instead, the dirt will be suctioned into the inlet and conveyed to the fuel filter 22 where the dirt is collected. Likewise, by spacing the posts at distance 42, the paraffin molecule chains that form in the diesel fuel at extreme cold temperature will not accumulate to block the flow of fuel between the posts 34.

Figure 3:
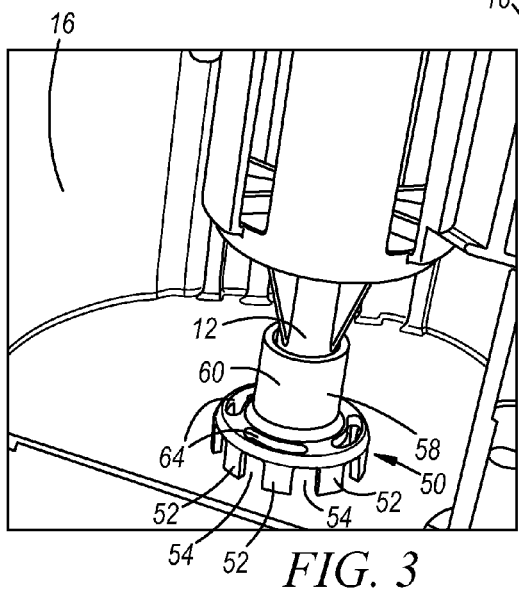
FIG. 3 is a view similar to FIGS. 1 and 2 but showing another embodiment of the invention in which a fence mounted on the fuel suction tube prevents ice wafers from reaching the inlet of the fuel suction tube.

FIG. 3 shows another embodiment of the invention. In FIG. 3, a fence, generally indicated at 50, is provided by a plurality of posts 52 that depend downwardly from the suction tube 12. More particularly, as seen in FIG. 3 the plurality of posts 52 define therebetween a plurality of radial fuel flow openings 54 that are each smaller than the diameter of the inlet 14 of the suction tube 12. In addition, the posts 52 are either touching the floor 16 of the reservoir 10, or are so close to the floor 16 that the ice wafers cannot squeeze into the space directly below the inlet 14 of the suction tube 12. Accordingly, by properly sizing the posts 52 and the openings 54 between the posts 52, we have found that we can prevent the ice wafers from being sucked into the suction tube 12. FIG. 3 shows the posts 52 provided on a molded plastic cap 58. The cap 58 includes a stem 60 that is either slip fit or force fit or otherwise attached onto the end of the suction tube 12. The cap has a flange 62 and a plurality of small fuel flow slots 64 are provided through which diesel fuel can also flow to the inlet. The slots 64 are each of a size that is less than the diameter of the inlet 14 of the suction tube 12 so that any ice wafer that is able to pass through the slots 64 will be too small to block the inlet 14 of the suction tube 12. As an alternative, the posts 52 can be molded integrally onto the end of the suction tube 12. Also, if desired, the slots 64 can be molded integrally with the suction tube 12.

Figure 4:
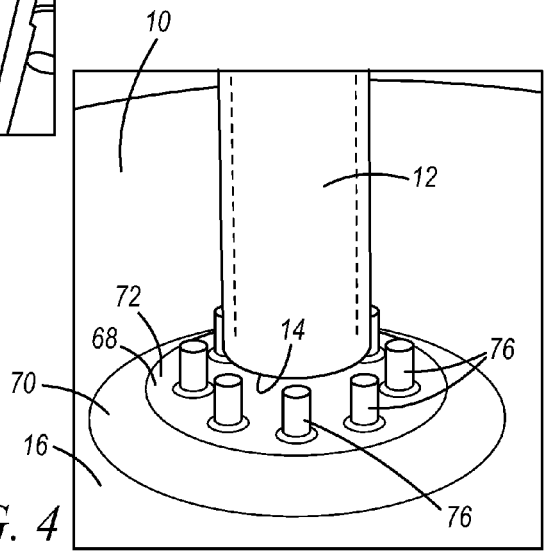
FIG. 4 is a view similar to FIGS. 1, 2 and 3, but showing the floor having a elevated floor portion that underlies the inlet of the fuel suction tube.

FIG. 4 shows another embodiment of the invention. In FIG. 4 the floor 16 of the reservoir 10 has an integrally formed dome 68 that rises upwardly from the level of the floor 16. The dome 68 includes an upwardly angled sidewall 70 and a elevated floor portion 72. The elevated floor portion 72 directly underlies the inlet 14 of the suction tube 12. Elevated floor portion 72 is elevated above the level of the floor 16. In FIG. 4, the ice fence is comprised of a plurality of cylindrical posts 76 that are arrayed in a circle around the inlet 14 and rise from the elevated floor 72. Any water that resides in the fuel will sink to the lowest point in the reservoir 10 before freezing. The elevated floor portion 72, by being at a higher level than the floor 16, will assure that the water cannot come to rest directly low the inlet and freeze into an ice wafer that would be inside the promoter of the fence created by the cylindrical post 76.

A person of ordinary skill in the art will appreciate that the ice wafer fence of this invention can be executed in many different shapes. For example, although we show triangular shaped posts in FIG. 1, the posts can be of any shape. In addition, in FIG. 3, although we are showing the fence provided on a cap installed on the bottom of the suction tube 12, it will be apparent that, as an alternative, the posts 34 can be molded integrally on the bottom of the fuel suction tube 36.

Thus, the invention solves the problem of ice wafers being sucked into the fuel suction tube of the diesel engine by providing a fence that surrounds the inlet of the suction tube to fence out the wafers that would block the suction tube. The fence includes fence posts that are spaced apart and define therebetween fuel flow openings, and the distance between the posts is generally less than the size of the inlet of the suction tube so that ice wafers are held at a distance from the inlet as fuel is suctioned into the inlet. Any ice wafers that can pass between the posts are of a diameter less than the diameter of the inlet of the fuel suction tube and therefore cannot block the inlet and starve the engine for fuel.

What is claimed is:

1. In a diesel fuel system:
    a reservoir containing diesel fuel and having a floor;
    a suction tube for suctioning fuel from the reservoir, the tube having an inlet so that fuel can be suctioned into the inlet;
    the floor having an elevated floor portion at an elevation higher than the floor, and the inlet being spaced above the elevated floor portion;
    and a fence erected around the inlet to prevent ice wafers from blocking the suction tube.

2. The diesel fuel system of claim 1 further comprising the fence being mounted on the floor of the reservoir.

3. The diesel fuel system of claim 1 further comprising the fence being mounted on the suction tube.

4. The diesel fuel system of claim 1 further comprising the fence being a plurality of posts extending upwardly from the floor of the reservoir and arrayed around the inlet of the suction tube.

5. The diesel fuel system of claim 1 further comprising the fence being a plurality of posts extending downwardly from the suction tube.

6. The diesel fuel system of claim 1 further comprising the fence being a plurality of posts, the posts being spaced apart to define openings therebetween for the flow of fuel, the dimension of the openings between the posts being less than the diameter of the inlet of the suction tube so that any ice wafers that can pass between the posts are of a diameter less than the diameter of the inlet of the suction tube.

7. The diesel fuel system of claim 6 further comprising the fence being mounted on the floor of the reservoir.

8. The diesel fuel system of claim 6 further comprising the fence being mounted on the suction tube.

9. The diesel fuel system of claim 8 further comprising a cap mounted on the suction tube adjacent the inlet and the fence posts being provided on the cap and extending toward the floor of the reservoir.

10. In a diesel fuel system:
    a reservoir containing diesel fuel and having a floor;
    a suction tube for suctioning fuel from the reservoir, the tube having an inlet so that fuel can be suctioned into the inlet;
    the floor having an elevated floor portion at an elevation higher than the floor, and the inlet being spaced above the elevated floor portion;
    and a fence erected on the suction tube around the inlet to prevent ice wafers from blocking the suction tube.

11. The diesel fuel system of claim 10 further comprising the fence being provided on a molded plastic cap mounted on the end of the suction tube.

12. The diesel fuel system of claim 10 further comprising a cap mounted on the end of the suction tube, the cap having a plurality of fence posts extending downwardly toward the floor and defining fuel flow openings between the fence posts.

13. In a diesel fuel system:
    a reservoir containing diesel fuel and having a floor;
    a suction tube for suctioning fuel from the reservoir, the tube having an inlet so that fuel can be suctioned into the inlet;
    the floor having an elevated floor portion at an elevation higher than the floor, and the inlet being spaced above the elevated floor portion;
    and a fence erected on the floor around the inlet to prevent ice wafers from blocking the suction tube.

14. The diesel fuel system of claim 13 further comprising: the fence being a plurality of fence posts that extend upwardly from the floor, the fence posts being close enough to one another and close enough to the suction tube to allow the passage of only ice wafers that are will not block the inlet.

15. The diesel fuel system of claim 14 further comprising the inlet being spaced above the floor and the fence being a plurality of fence posts having a height that is greater than the space between the inlet and the floor.

16. The diesel fuel system of claim 13 further comprising a molded plastic cap mounted on the end of the suction tube, the cap having a horizontal flange wall and a plurality of fence posts extending downwardly toward the floor to define fuel flow openings between the fence posts, and the horizontal flange wall of the cap having fuel flow slots therein.

17. The diesel fuel system of claim 16 further comprising each of the fuel flow openings and fuel flow slots provided in the molded plastic cap are of a size that is less than the diameter of the suction tube so that ice wafers that would block the suction tube are prevented from entering the suction tube.

\* \* \* \* \*